US012346669B2

(12) United States Patent
Rai et al.

(10) Patent No.: US 12,346,669 B2
(45) Date of Patent: Jul. 1, 2025

(54) METHOD AND SYSTEM FOR GENERATING ENGINEERING PROGRAMS FOR AN INDUSTRIAL DOMAIN

(71) Applicant: Siemens Aktiengesellschaft, Munich (DE)

(72) Inventors: Himanshu Rai, Bangalore (IN); Elvis Antony, Karnataka (IN); Aneesh Kumar R, Karnataka (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 448 days.

(21) Appl. No.: 17/713,408

(22) Filed: Apr. 5, 2022

(65) Prior Publication Data
US 2022/0334807 A1    Oct. 20, 2022

(30) Foreign Application Priority Data
Apr. 16, 2021   (EP) .................................... 21168907

(51) Int. Cl.
G06F 8/30         (2018.01)
G05B 19/05     (2006.01)
(52) U.S. Cl.
CPC ............... *G06F 8/30* (2013.01); *G05B 19/05* (2013.01); *G05B 2219/13004* (2013.01)
(58) Field of Classification Search
CPC .... G06F 8/20–36; G06F 8/60–64; G06F 8/70; G06F 8/74–77; G05B 19/05;
(Continued)

(56) References Cited

U.S. PATENT DOCUMENTS 7,895,568 B1 *  2/2011  Goodwin .............. G06Q 10/10
                                                                717/107
8,312,421 B1 * 11/2012  Brewton ................... G06F 8/36
                                                                717/109
(Continued)

OTHER PUBLICATIONS

Ernadote et al., "Ontology-Based Pattern for System Engineering" published by IEEE, computer society, 2017 ACM/IEEE 20th International Conference on Model Driven Engineering Languages and System, pp. 248-258 (Year: 2017).*

*Primary Examiner* — S. Sough
*Assistant Examiner* — Zheng Wei
(74) *Attorney, Agent, or Firm* — Schmeiser, Olsen & Watts LLP

(57) ABSTRACT

A method and system for generating engineering programs for one or more engineering objects in a technical installation is provided. The method includes receiving a request to generate an engineering program associated with the technical installation. The method further includes determining a set of programming blocks from a plurality of programming blocks corresponding to a set of industrial domains. The method further includes generating an ontology schema for the set of programming block. The ontology schema includes information about relationships between a set of variables corresponding to each programming block in the set of programming blocks and a set of Key performance indicators associated with the set of programming blocks. The method further includes generating the engineering program associated with the technical installation by modification of the set of programming blocks.

12 Claims, 11 Drawing Sheets

(58) Field of Classification Search
CPC ......... G05B 2219/13004; G05B 717/104–113; G05B 717/168–178
See application file for complete search history.

(56) References Cited

U.S. PATENT DOCUMENTS

| | | | | |
|---|---|---|---|---|
| 8,806,425 | B1* | 8/2014 | Willis | G06F 8/35 |
| | | | | 717/106 |
| 9,977,656 | B1* | 5/2018 | Mannopantar | G06F 11/3616 |
| 2008/0276229 | A1* | 11/2008 | Hawkins | G06F 8/10 |
| | | | | 717/136 |
| 2008/0307385 | A1* | 12/2008 | Dreiling | G06F 8/38 |
| | | | | 717/108 |
| 2011/0283260 | A1* | 11/2011 | Bucuvalas | G06F 11/3664 |
| | | | | 717/124 |
| 2013/0007693 | A1* | 1/2013 | Bliss | G06F 8/30 |
| | | | | 717/101 |
| 2013/0055194 | A1* | 2/2013 | Weigert | G06F 8/10 |
| | | | | 717/106 |
| 2021/0141717 | A1* | 5/2021 | Ananthapur Bache | |
| | | | | G06F 11/3688 |

* cited by examiner

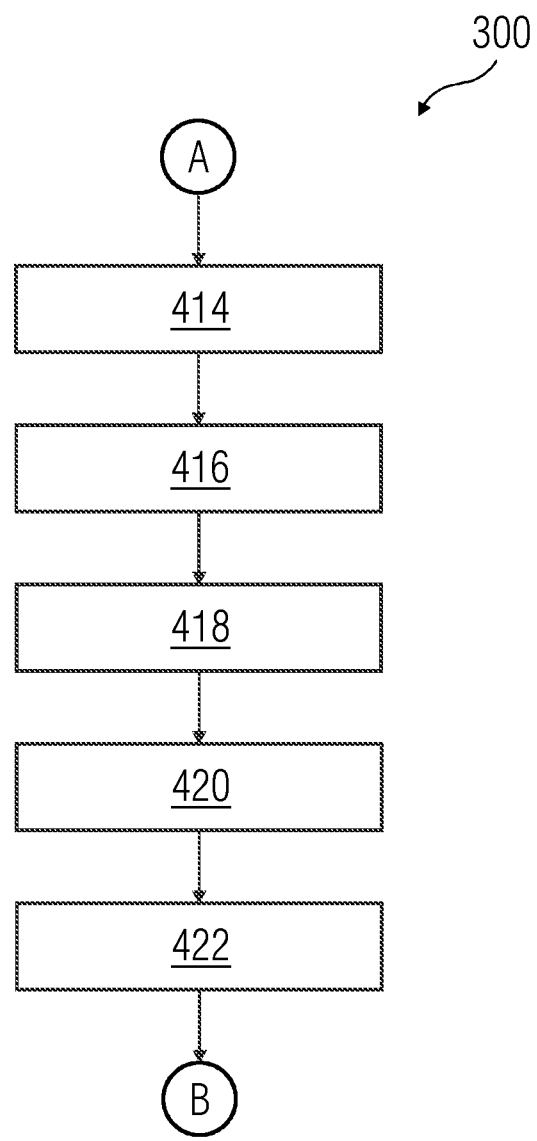

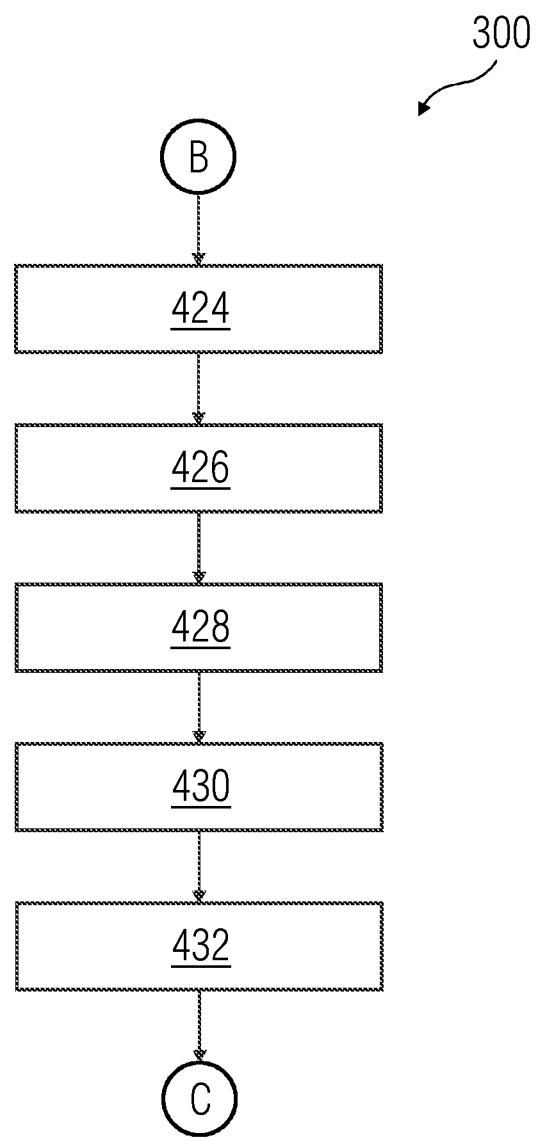

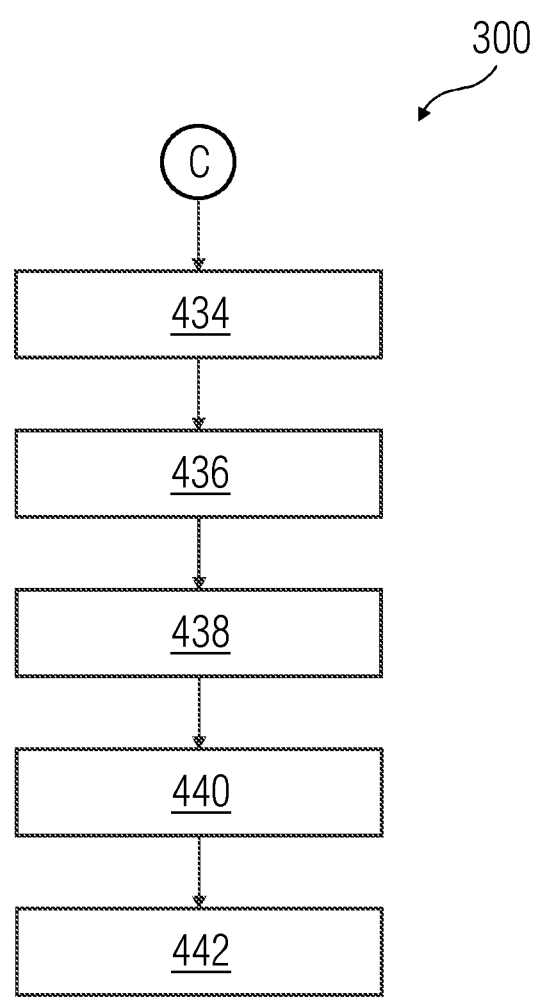

METHOD AND SYSTEM FOR GENERATING ENGINEERING PROGRAMS FOR AN INDUSTRIAL DOMAIN

CROSS-REFERENCE TO RELATED APPLICATIONS

This application claims priority to EP Application No. 21168907.0, having a filing date of Apr. 16, 2021, the entire contents of which are hereby incorporated by reference.

FIELD OF TECHNOLOGY

The following relates to a field of engineering of computer assisted programming, and more particularly relates to a method and system for generating engineering programs for an industrial domain.

BACKGROUND

A technical installation such as an industrial plant comprises one or more devices which is controlled by one or more engineering objects. Examples of the one or more engineering objects may include, for example, a programmable logic controller, one or more field devices, or any other automation devices. Examples of the one or more devices includes but is not limited to, control valves, motors, pumps, and actuators.

The one or more engineering objects control the one or more devices by execution of an engineering program which may be stored in a memory. The engineering program may include a plurality of machine readable instructions to control the one more devices. The engineering program is coded by taking into account of a plurality of parameters associated with the one or more devices, the one or more engineering objects, and the technical installation. Examples of the plurality of parameters includes, but is not limited to a processing speed and a memory capability of the one or more engineering objects, one or more physical properties of the one or more devices, a plurality of physical connections between the one or more engineering objects and the one or more devices, and an industrial domain of operation of the technical installation. The industrial domain of the technical installation is indicative of an objective of the technical installation. For example, the technical installation may be a manufacturing plant to manufacture glass bottles. In such a case, the industrial domain of the technical installation may be "glass manufacturing industry". Similarly, examples of the industrial domain may include, but is not limited to a "oil refining industry", "a food processing industry" and "a coal mining industry". A plurality of functions of the one or more engineering objects may vary based on the industrial domain of the technical installation.

Typically, a code developer generates an engineering program in an engineering system configured to handle graphical programming blocks. In order to generate the engineering program for the technical installation, the code developer may have to write several graphical programs for each of the one or more engineering objects, based on the plurality of parameter values, the one or more physical properties of the one or more devices, the plurality of physical connections between the one or more engineering objects and the one or more devices. In one example, the code developer generates the engineering program by dragging and dropping one or more desired graphical program blocks from an element library, into the engineering system. Later, the engineering program is compiled and downloaded onto the one or more engineering objects such as a programmable logic controller (PLC) used for industrial control applications.

Conventional engineering systems employ functions and other resources to provide assistance to the code developer in designing and implementing engineering programs related to the technical installation. However, these conventional engineering systems lack automated engineering methods that automatically generate engineering programs for the technical installation based on the industrial domain of the technical installation. For example, if the code developer modifies a line in a first programming block of the engineering program, the conventional engineering systems fail to notify the code developer about one or more key performance indicators of the engineering program which may be affected by the modification of the line.

In another example, conventional engineering systems fail to provide automated programming assistance by offering guidance or suggestions to optimize a quality of code that is written by the code developer.

In yet another example, if the code developer has to correct an erroneous code, the code developer may have to analyze the erroneous code line by line, which may consume a huge amount of time. The conventional engineering systems fail to automatically determine one or more errors in the erroneous code. Hence, there are no mechanisms to automate engineering involved in generating engineering programs.

Currently, the engineering programs used in the technical installations comprise a huge number of programming blocks, each of which are enormous in code length. The code developer may find it impossible to manually go through such gigantic blocks of code in order to predict errors, and variations in key performance indicators. Thus, if the code developer is not provided with automated assistance to optimize code, to detect errors in code, and to identify variations in key performance indicators due to modification in code, huge amount of labor and time is wasted. Moreover, the code developer may find it impossible to complete code development in time.

Further, the engineering program may have a huge number of programming elements such as variables, classes, and functions which may be defined in a first programming block of the engineering block. The programming elements may be referenced in other programming blocks of the plurality of programming blocks. Thus, any modification of the first programming block which results in modification in definition of the plurality of programming elements, may cause a plurality of errors in the other programming blocks of the plurality of programming blocks. In existing systems, the code developer may have to study a myriad of such definitions and references of the plurality of programming elements, before modifying any one of the plurality of programming blocks. It is impossible for the code developer to manually go through the huge number of programming elements as well as identify the interrelationships between the programming elements in the plurality of programming blocks.

In light of above, there exists a need for an efficient method and system for generating engineering programs for a technical installation.

SUMMARY

An aspect relates to a method and system for generating engineering programs for a technical installation.

The aspect of embodiments of the invention is achieved by a method of generating engineering programs for one or more engineering objects in a technical installation. The method comprises receiving by a processing unit, a request to generate an engineering program associated with the technical installation. The request comprises an industrial domain associated with the technical installation. The technical installation is at least one of an industrial manufacturing plant, an industrial processing plant, or an industrial power plant. The technical installation comprises one or more engineering objects. The one or more engineering objects are devices which function together in the technical installation to achieve one or more objectives of the technical installation. Examples of the one or more engineering objects comprises servers, robots, switches, automation devices, programmable logic controllers (PLC)s, human machine interfaces (HMIs), motors, valves, pumps, actuators, sensors and other industrial equipment(s). The one or more engineering objects comprises a processor and a memory. The memory is configured to store one or more engineering programs and a plurality of programming blocks. The processor of the one or more engineering object is configured to execute the one or more engineering program to achieve one or more key performance indicators associated with the one or more engineering programs. Examples of the one or more key performance indicators includes a processing speed, a memory requirement, and a process efficiency of the one or more engineering programs, when the one or more engineering programs are executed by the processor of the one or more engineering objects.

A plurality of functions of the one or more engineering objects may vary based on the industrial domain of the technical installation. Thus the received request comprises an instruction to generate the engineering program which, when executed by the one or more engineering objects, causes the one or more engineering object to perform a set of functions which are specific to the industrial domain of the technical installation. The one or more engineering objects in the technical installation may be connected to each other via one or more physical connections. The one or more physical connections may comprise a physical link (such as wirings or cables). In an alternate embodiment, the connections may also be a virtual link. Further, functioning of the one or more engineering objects may be defined based on a plurality of parameter values. The plurality of parameter values comprises motor configuration parameters, network and communication parameter, valve controls, temperature or pressure values of a sensor, speed, torque and the like.

Further, the method comprises determining, by the processing unit, a set of programming blocks from a plurality of programming blocks corresponding to a set of industrial domains, based on the industrial domain associated with the technical installation. In one example, each programming block of the set of programming block may comprises a sequence of programming code which, when executed by the one or more engineering objects, causes the one or more engineering objects to perform one or more functions. The sequence of programming codes are coded as at least one of a machine readable instruction written in a natural language, a high level programming language, an assembly language, or compiled code. The set of programming blocks that is specific to the industrial domain of the technical installation, is determined from the plurality of programming blocks associated with the set of the industrial domains. Thus, the determined set of programming blocks, when executed by the one or more engineering objects, performs a plurality of functions which are specific to the industrial domain of the technical installation. The set of programming blocks that is suited for the industrial domain of the technical installation, is automatically determined without manual intervention. Code development time and labor required to generate the engineering program for the technical installation is significantly reduced.

Further, the method comprises generating, by the processing unit, an ontology schema for the set of programming blocks. The ontology schema comprises information about relationships between a set of variables corresponding to each programming block in the set of programming blocks and a set of Key performance indicators associated with the set of programming blocks. The set of variables comprises a plurality of data and pointer variables defined and used in the set of programming blocks. The set of key performance indicators associated with the set of programming blocks are key performance indicators achieved by the one or more engineering objects, when the one or more engineering objects executes the set of programming blocks. The ontology schema is an abstraction of a programming domain that captures semantics of a plurality of programming concepts such as class hierarchy, command lines, data variables, and data structures of the set of programming blocks and one or more relationships amongst the plurality of programming concepts concepts and a plurality of the program attributes like class hierarchy, member variables declared, data types of the variables, memory segments used, system functions and resources used, links to other industrial domain objects, etc. Thus, the ontology schema is realized as a knowledge graph. In one example, the ontology schema is a knowledge graph based representation comprising a plurality of layers.

The knowledge graph based representation of the set of programming blocks comprises a combination of a control flow graph and a data flow graph of the set of programming blocks. The control flow graph is a graphical representation of a sequence of execution of each command in the set of programming blocks, when the set of programming blocks are executed by the one or more engineering objects. The data flow graph is a graphical representation of a sequence of flow of data among one or data variables in the set of programming blocks, when the set of programming blocks are executed by the one or more engineering objects. The knowledge graph based representation encapsulates a semantics of the set of programming blocks as a structure that can be queried in an extremely fast and scalable manner compared to other forms of representation. The plurality of layers comprises a first, a second, a third, and a fourth knowledge graph layers.

The first knowledge graph layer comprises knowledge associated with the industrial domain of the technical installation. The second knowledge graph layer indicates a relationship between the industrial domain and the set of variables in each programming block of the set of programming blocks. The third knowledge graph layer indicates a relationship between a plurality of program Key Performance Indicators associated with the set of programming blocks, and the set of variables in each block of the set of programming blocks. The fourth knowledge graph layer indicates an object behavior model associated with the one or more engineering objects in the technical installation. The object behavior model is a knowledge graph based representation of the one or more engineering objects superimposed with one or more behavioral information associated with the one or more engineering objects. The one or more behavioral information comprises information associated with relationship between the plurality of parameter values associated with the one or more engineering objects, and one or more thresholds and conditions associated with the industrial domain of the technical installation. For example, a first parameter value, such as a rotation per minute (rpm) of a motor may be controlled by a first engineering object, such as a motor controller. A first condition that the first parameter value must be lower than a specified threshold, may be applicable to the first parameter value. The object behavior model may store information associated with the first condition. The method further comprises analyzing, by the processing unit, the ontology schema associated with the set of programming blocks.

Further, the method comprises generating, by the processing unit, the engineering program associated with the technical installation by modification of the set of programming blocks. The set of programming blocks is modified based on the analysis of the ontology schema. The modifications comprise any changes such as addition, deletion, update, replacement or revision of one or more variables, code lines, classes, functions, or comments in the set of programming blocks. In one example, an outcome of analysis of the ontology schema may be a behavior report indicating whether behavior or characteristic of each programming block of the set of programming blocks as defined in the ontology schema is acceptable, improvised, enhanced, optimized or the like. Thus, the set of programming blocks are modified based on the relationships between the set of variables corresponding to each programming block in the set of programming blocks, the set of Key performance indicators associated with the set of programming blocks, and the industrial domain of the technical installation. Thus, the engineering program is generated based on the relationships between the set of variables corresponding to each programming block in the set of programming blocks, the set of Key performance indicators associated with the set of programming blocks, and the industrial domain of the technical installation. In other words, the set of programming blocks are customized based on the ontology schema, to generate the engineering program which is suitable for the one or more engineering objects in the technical installation.

Further, the method comprises modifying, by the processing unit, a first programming block of the set of programming blocks, based on a user instruction. The user instruction is at least one of a text-based user instruction, a voice-based user instruction, and a gesture-based user instruction. In one example, a user, such as a code developer may modify the first programming block by entering one or more programming lines into the first programming block of the set of programming blocks, by use of an data input device such as a keyboard. Further, the method comprises predicting, by the processing unit, an occurrence of a variation in one or more key performance indicators associated with the set of programming blocks, based on the analysis of the ontology schema. The variation is predicted to occur as a result of the modification of the first programming block, which may have resulted in changes in a plurality of control flow and data flow paths between each programming blocks of the set of programming blocks. The plurality of control flow and data flow paths are syntactic and semantic interconnections and relationships between each programming block of the set of programming blocks and one or more other programming blocks of the set of programming blocks. For example, a first programming block of the set of programming block may inherit one or more classes, functions, and/or variables from a second programming block of the set of programming block. Thus, isolated modification of any one programming block of the set of programming blocks may result in errors during compilation of other programming blocks of the set of programming blocks. Alternatively, any modification in the first programming block may modify one or more key performance indicators associated with the set of programming blocks.

In a preferred embodiment, the method comprises determining, by the processing unit, one or more modifications for one or more programming blocks of the set of programming blocks. The one or more modifications are determined such that the determined one or more modifications, when implemented in the one or more programming blocks, prevents the occurrence of the predicted variation in the one or more key performance indicators. In one example, a name of a variable, which is defined in the first programming block, is modified in the first programming block. In such a case, the method comprises determining a second programming block, in the set of programming blocks, in which the name of the variable is unchanged. The method further comprises predicting variation in a key performance indicator such as compilation time, as a result of the modification of the name of the variable. The variation in the compilation time may occur because of a lack of modification of the name of the variable in one or more references to the variable, in the second programming block. In such a case, the method comprises determining, based on the analysis of the ontology schema, that the name of the variable in the one or more references to the modified variable, in the second programming block is to be modified so that any variation in the compilation time is prevented. In another example, a value of a variable, which is defined in the first programming block, is modified in the first programming block. In such a case, the method comprises determining a second programming block, in the set of programming blocks, which comprises one or more condition statements associated with the modified variable. Further, the method comprises predicting an occurrence of the variation in the key performance indicator such as compilation error, as a result of the modification of the value of the variable. In such a case, the method comprises determining that the one or more condition statements in the second block are to be modified such that the occurrence of the variation in the compilation time of the set of programming blocks is prevented.

In another preferred embodiment, the method comprises modifying, by the processing unit, the one or more programming blocks of the set of programming blocks, based on the determined one or more modifications for the one or more programming blocks, to prevent the occurrence of the variation in the one or more key performance indicators associated with the set of programming blocks. Any variation in the one or more key performance indicators, which may occur due to modification of the first programming block, is prevented by automatic modification of other programming blocks of the set of programming blocks. Thus, if any one of the set of programming block is modified, the method enables automatic readjustment of other programming blocks of the set of programming blocks to optimize the one or more key performance indicators associated with the set of programming blocks.

In another preferred embodiment, the method comprises analysing, by the processing unit, the set of programming blocks to determine one or more errors in a first programming block of the set of programming blocks. The method comprises modifying, by the processing unit, the first programming block of the set of programming blocks, to eradicate the determined one or more errors in the first programming block of the set of programming blocks. The method comprises predicting, by the processing unit, an occurrence of a variation in one or more key performance indicators associated with the set of programming blocks based on the analysis of the ontology schema, wherein the variation is predicted to occur as a result of the modification of the first programming block. The method further comprises determining, by the processing unit, one or more modifications for one or more programming blocks of the set of programming blocks, such that an implementation of the determined one or more modifications in the one or more programming blocks prevents the occurrence of the predicted variation in the one or more key performance indicators. Further, the method comprises modifying, by the processing unit, the one or more programming blocks of the set of programming blocks, based on the determined one or more modifications for the one or more programming blocks, to prevent the occurrence of the variation in the one or more key performance indicators associated with the set of programming blocks.

In yet another preferred embodiment, the method comprises generating, by the processing unit, a simulation instance for one or more engineering objects of the technical installation. In one example, the simulation instance is a digital twin of the one or more engineering objects. The method further comprises simulating, by the processing unit, execution of the generated engineering program by the one or more engineering objects of the technical installation in a simulation environment by executing the set of programming blocks on the generated simulation instance. The method further comprises determining, by the processing unit that the generated engineering program is valid, based on a result of the simulated execution of the generated second set of programming blocks. Further, the method comprises deploying, by the processing unit, the generated engineering program in real-time onto the one or more engineering objects, based on a determination that the generated engineering program is valid. The generated engineering program is only deployed onto the one or more engineering objects after the determination that the generated engineering program is valid. Further, the method comprises displaying, by the processing unit, the generated engineering program on a display device. The user is enabled to document the generated engineering program.

In yet another preferred embodiment, the method comprises notifying, by the processing unit, about an invalidity of the generated engineering program, based on a determination that the generated engineering program is invalid. The user is informed that the generated engineering program is invalid. Thus, the user is enabled to correct and troubleshoot the engineering program. The method further comprises generating, by the processing unit, a plurality of error log files associated with the generated engineering program, based on the determination that the generated engineering program is valid. The plurality of error log files comprises a plurality of errors in the generated engineering programs. The plurality of errors are identified during the simulated execution of the generated engineering program. The method further comprises displaying, by the processing unit, the generated plurality of error log files on a display device.

The aspect of embodiments of the invention is achieved by a method of generating engineering programs for one or more engineering objects in a technical installation. The method comprises receiving, by a processing unit, a set of programming blocks associated with one or more engineering objects in a technical installation. The method further comprises receiving, by the processing unit, a set of desired key performance indicators associated with the set of programming blocks. The method further comprises generating, by the processing unit, an ontology schema for the set of programming blocks. The ontology schema comprises information about relationships between a set of variables corresponding to each programming block in the set of programming blocks, a set of Key performance indicators associated with the set of programming blocks and internal logic which is defined in the set of programming blocks. The method further comprises analyzing, by the processing unit, the ontology schema associated with the set of programming blocks. The method further comprises generating, by the processing unit, a first engineering program associated with the technical installation by modification of the set of programming blocks. The first engineering program is generated based on the analysis of the ontology schema. A plurality of key performance indicators of the first engineering program matches with the received set of desired key performance indicators.

In a preferred embodiment, the method comprises receiving, by the processing unit, a user request to optimize the set of programming blocks. The method further comprises determining, by the processing unit, an optimal set of key performance indicators for the one or more engineering objects. The method further comprises generating, by the processing unit, a second engineering program associated with the technical installation by modification of the set of programming blocks. The second engineering program is generated based on the analysis of the ontology schema. A plurality of key performance indicators of the second engineering program match with the determined optimal set of key performance indicators.

In yet another preferred embodiment, the method comprises detecting, by the processing unit, a reduction in one or more key performance indicators associated with the set of programming blocks. The method further comprises generating, by the processing unit, a third engineering program associated with the technical installation by modification of the set of programming blocks. The third engineering program is generated based on the analysis of the ontology schema. A plurality of key performance indicators of the third engineering program compensates the detected reduction in the one or more key performance indicators associated with the set of programming blocks.

The object of the present disclosure is also achieved by an engineering system for generating engineering programs. The engineering system comprises one or more processor(s) and a memory coupled to the processor. The memory comprises an automation module stored in the form of machine-readable instructions executable by the processor. The automation module is configured for performing the method as described above.

The object of the present disclosure is also achieved by an industrial environment. The industrial environment comprising an engineering system, a technical installation comprising one or more physical components and one or more client devices communicatively coupled to the engineering system and the technical installation. The engineering system is configured to perform the above described method steps.

The object of the present disclosure is also achieved by a computer-program product having machine-readable instructions stored therein, that when executed by one or more processor(s), cause the one or more processor(s) to perform method steps as described above.

The above-mentioned and other features of embodiments of the invention will now be addressed with reference to the accompanying drawings of the present disclosure. The illustrated embodiments are intended to illustrate, but not limit embodiments of the invention.

BRIEF DESCRIPTION

Some of the embodiments will be described in detail, with reference to the following figures, wherein like designations denote like members, wherein:

FIG. 4B is a process flowchart illustrating an exemplary method of generating engineering programs in an engineering system, according to an embodiment of the present disclosure;

FIG. 4C is a process flowchart illustrating an exemplary method of generating engineering programs in an engineering system, according to an embodiment of the present disclosure;

FIG. 4D is a process flowchart illustrating an exemplary method of generating engineering programs in an engineering system, according to an embodiment of the present disclosure;

Figure 6A:
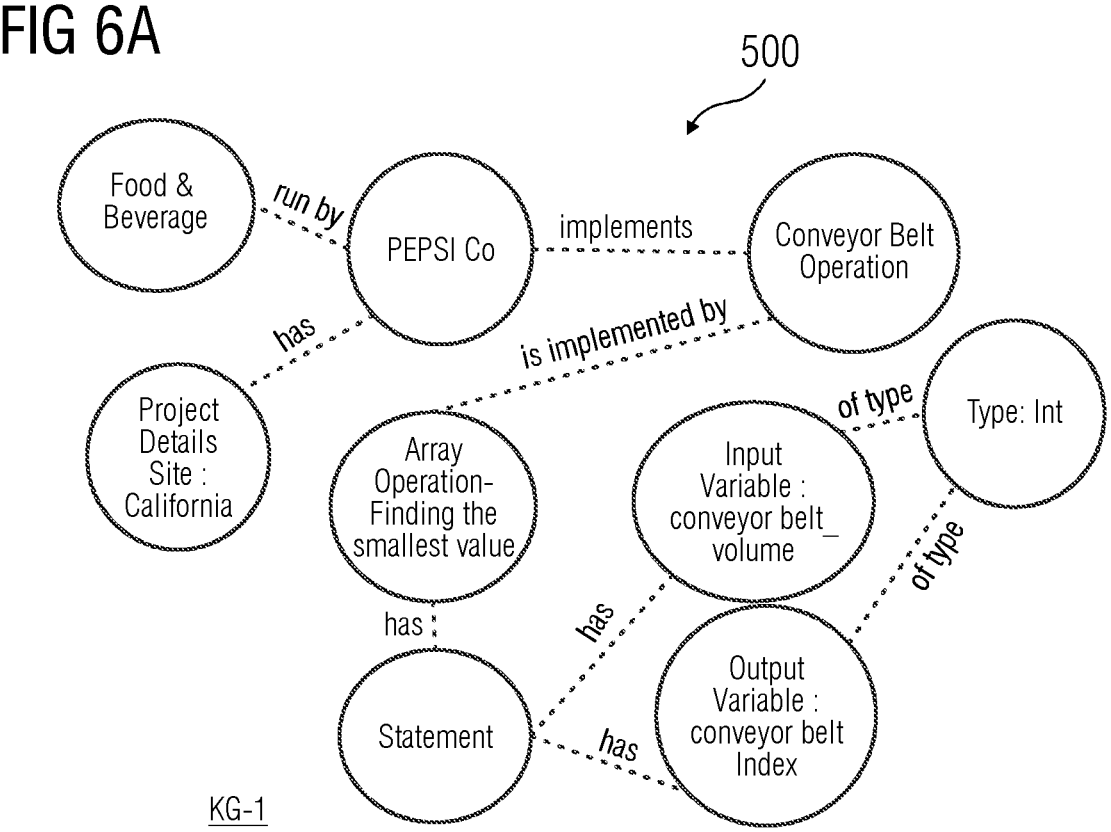
FIG. 6A is a schematic representation of an exemplary object behavior model, according to an embodiment of the present disclosure.
Figure 6B:
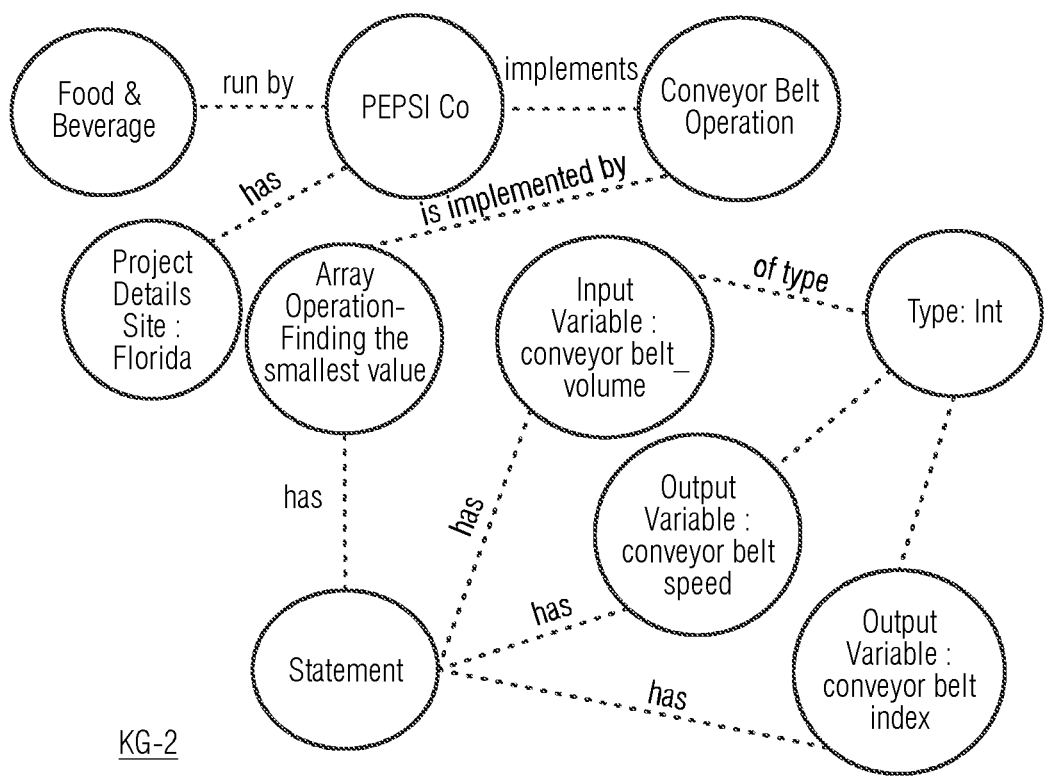
Figure 6C:
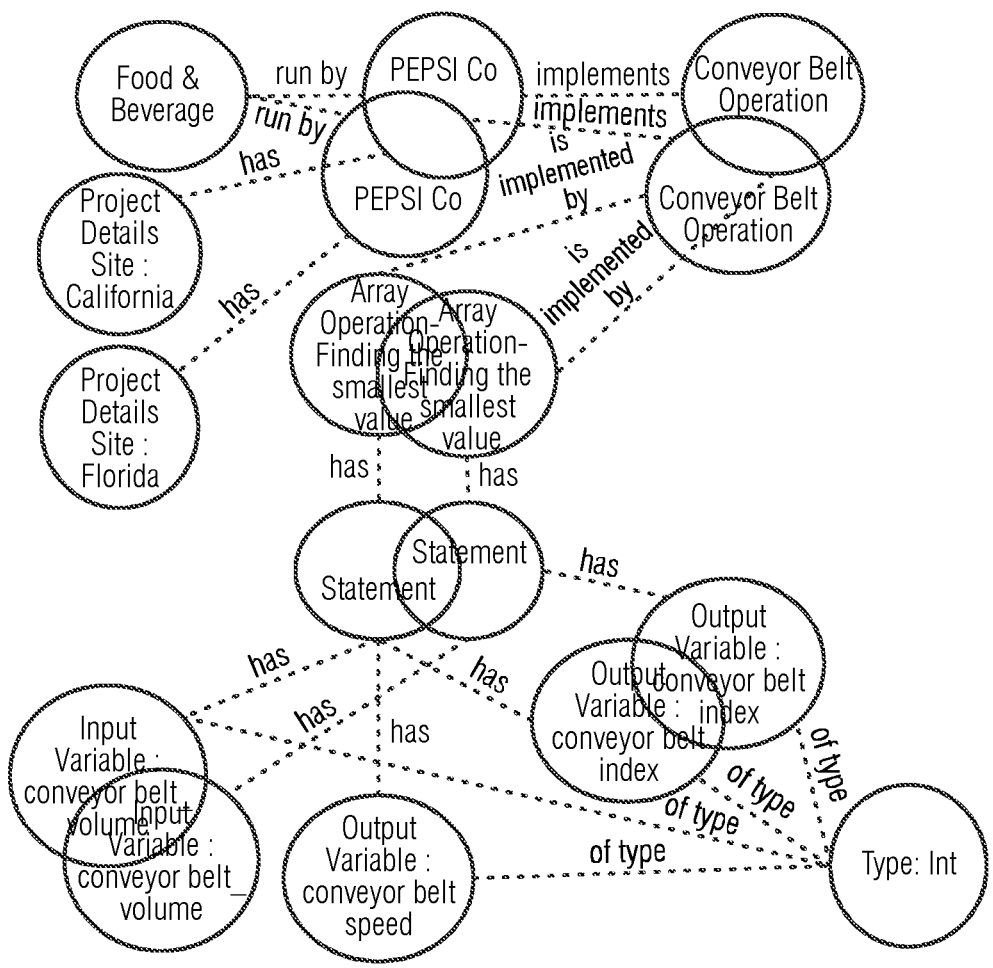

FIG. 6B is a schematic representation of an exemplary object behavior model, according to an embodiment of the present disclosure; and FIG. 6C is a schematic representation of an exemplary object behavior model, according to an embodiment of the present disclosure In the following description, for the purpose of explanation, numerous specific details are set forth in order to provide thorough understanding of one or more embodiments. It may be evident that such embodiments may be practiced without these specific details.

DETAILED DESCRIPTION

Figure 1:
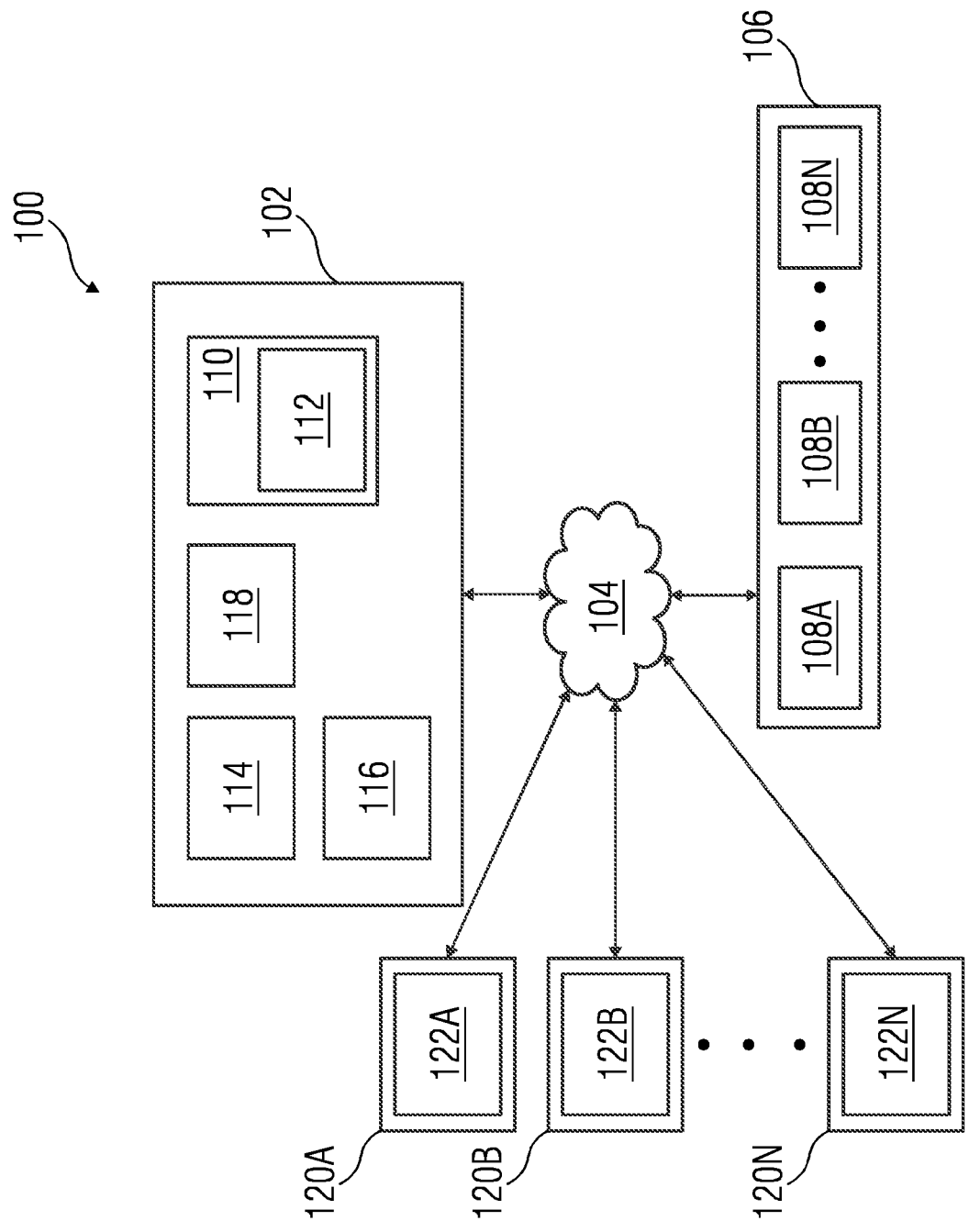
FIG. 1 is a block diagram of an industrial environment capable of generating engineering programs, according to an embodiment of the present disclosure.

FIG. 1 is a block diagram of an industrial environment 100 capable of generating engineering programs, according to an embodiment of the present disclosure. In FIG. 1, the industrial environment 100 includes an engineering system 102, a technical installation 106 and one or more client devices 120A-N. As used herein, "industrial environment" refers to a processing environment comprising configurable computing physical and logical resources, for example, networks, servers, storage, applications, services, etc., and data distributed over a platform, such as cloud computing platform. The industrial environment 100 provides on-demand network access to a shared pool of the configurable computing physical and logical resources. The engineering system 102 is communicatively connected to the technical installation 106 via the network 104 (such as Local Area Network (LAN), Wide Area Network (WAN), Wi-Fi, Internet, any short range or wide range communication). The engineering system 102 is also connected to the one or more client devices 120A-N via the network 104.

The engineering system 102 is connected to one or more engineering objects 108A-N in the technical installation 106 via the network 104. The one or more engineering objects 108A-N may include servers, robots, switches, automation devices, programmable logic controllers (PLC)s, human machine interfaces (HMIs), motors, valves, pumps, actuators, sensors and other industrial equipment(s). The one or more engineering objects 108A-N may be connected to each other or several other components (not shown in FIG. 1) via physical connections. The physical connections may be through wiring between the one or more engineering objects 108A-N. Alternatively, the one or more engineering objects 108A-N may also be connected via nonphysical connections (such as Internet of Things (IOT)) and 5G networks. Although, FIG. 1 illustrates the engineering system 102 connected to one technical installation 106, one skilled in the art can envision that the engineering system 102 can be connected to several technical installations 106 located at different geographical locations via the network 104.

The client devices 120A-N may be a desktop computer, laptop computer, tablet, smart phone and the like. Each of the client devices 120A-N is provided with an engineering tool 122A-N for generating and/or editing engineering programs respectively. The client devices 120A-N can access the engineering system 102 for automatically generating engineering programs. The client devices 120A-N can access cloud applications (such as providing performance visualization of the one or more engineering objects 108A-N via a web browser). Throughout the specification, the terms "client device" and "user device" are used interchangeably.

The engineering system 102 may be a standalone server deployed at a control station or may be a remote server on a cloud computing platform. In a preferred embodiment, the engineering system 102 may be a cloud-based engineering system. The engineering system 102 is capable of delivering applications (such as cloud applications) for managing a technical installation 106 comprising one or more engineering objects 108A-N. The engineering system 102 may comprise a platform 110 (such as a cloud computing platform), an automation module 112, a server 114 including hardware resources and an operating system (OS), a network interface 116 and a database 118. The network interface 116 enables communication between the engineering system 102, the technical installation 106, and the client device(s) 120A-N. The interface (such as cloud interface)(not shown in FIG. 1) may allow the engineers at the one or more client device(s) 120A-N to access engineering project files stored at the engineering system 102 and perform one or more actions on the engineering project files as same instance. The server 114 may include one or more servers on which the OS is installed. The servers 114 may comprise one or more processors, one or more storage devices, such as, memory units, for storing data and machine-readable instructions for example, applications and application programming interfaces (APIs), and other peripherals required for providing computing (such as cloud computing) functionality. The platform 110 enables functionalities such as data reception, data processing, data rendering, data communication, etc. using the hardware resources and the OS of the servers 114 and delivers the aforementioned services using the application programming interfaces deployed therein. The platform 110 may comprise a combination of dedicated hardware and software built on top of the hardware and the OS. In an exemplary embodiment, the platform 110 may correspond to an Integrated Development Environment (IDE) comprising program editors and compilers which allow the users of the client devices 120A-N to generate engineering programs. The platform 110 may further comprise an automation module 112 configured for generating engineering programs. Details of the automation module 112 is explained in FIG. 3.

The database 118 stores the information relating to the technical installation 106 and the client device(s) 120A-N. The database 118 is, for example, a structured query language (SQL) data store or a not only SQL (NoSQL) data store. In an exemplary embodiment, the database 118 may be configured as cloud-based database implemented in the industrial environment 100, where computing resources are delivered as a service over the platform 110. The database 118, according to another embodiment of the present disclosure, is a location on a file system directly accessible by the automation module 112. The database 118 is configured to store engineering project files, engineering programs, object behavior model, parameter values associated with the one or more engineering objects 108A-N, test results, simulation results, status messages, one or more simulation instances, graphical programs, program logics, program logic patterns, engineering objects 108A-N and engineering object properties, one or more engineering object blocks, relationship information between the engineering objects, requirements, program update messages and the like.

Figure 2:
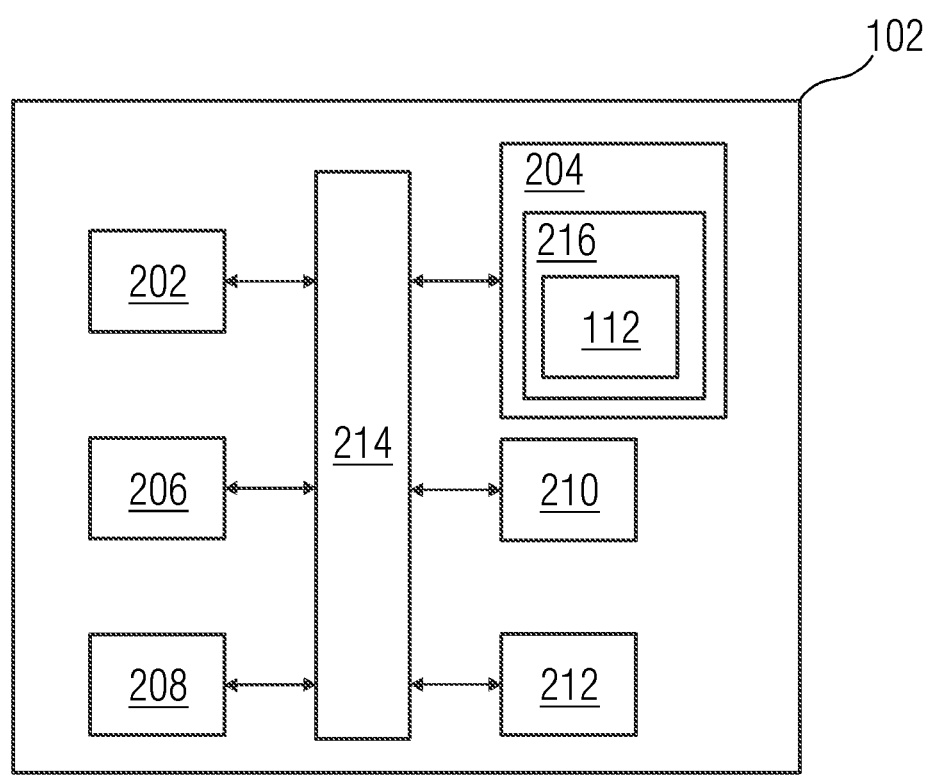
FIG. 2 is a block diagram of an engineering system, such as those shown in FIG. 1, in which an embodiment of the present disclosure can be implemented.

FIG. 2 is a block diagram of an engineering system 102, such as those shown in FIG. 1, in which an embodiment of the present disclosure can be implemented. In FIG. 2, the engineering system 102 includes a processor(s) 202, an accessible memory 204, a storage unit 206, a communication interface 208, an input-output unit 210, a network interface 212 and a bus 214.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes an integrated development environment (IDE) 216. The IDE 216 includes an automation module 112 stored in the form of machine-readable instructions on any of the above-mentioned storage media and may be in communication with and executed by the processor(s) 202.

When executed by the processor(s) 202, the automation module 112 causes the processor(s) 202 to generate engineering programs in the engineering system 102. In an embodiment, the automation module 112 causes the processor(s) 202 to receive a request to generate an engineering program for the one or more engineering objects 108A-N in the technical installation 106. The request comprises an industrial domain associated with the technical installation 106. The industrial domain of the technical installation 106 is indicative of an objective of the technical installation 106. For example, in one example, the technical installation 106 may be a manufacturing plant to manufacture glass bottles. In such a case, the industrial domain of the technical installation 106 may be "glass manufacturing industry". Similarly, examples of the industrial domain may include, but is not limited to a "oil refining industry", "a food processing industry" and "a coal mining industry". A plurality of functions of the one or more engineering objects 108A-N may vary based on the industrial domain of the technical installation 106. Thus the received request comprises an instruction to generate the engineering program which, when executed by the one or more engineering objects 108A-N, causes the one or more engineering objects 108A-N to perform a set of functions which are specific to the industrial domain of the technical installation 106. The engineering program is generated based on the one or more one or more engineering objects 108A-N in a portion of the technical installation 106, physical connections between the one or more engineering objects 108A-N, and a plurality of parameter values associated with the one or more engineering objects 108A-N and the physical connections. Upon receiving the request to generate the engineering program of the technical installation 106, the automation module 112 causes the processor(s) 202 to determine a set of programming blocks associated with the industrial domain of the technical installation 106, from a plurality of programming blocks associated with a set of industrial domains. The processor(s) 202 is further configured to generate an ontology schema of the set of programming blocks.

The ontology schema comprises information about relationships between a set of variables comprised in each programming block of the set of programming blocks, a set of Key performance indicators associated with the set of programming blocks and a plurality of the program attributes like class hierarchy, member variables declared, data types of the variables, memory segments used, system functions and resources used, links to other industrial domain objects. The set of variables comprises a plurality of data and pointer variables defined and used in the set of programming blocks. The set of key performance indicators associated with the set of programming blocks are key performance indicators achieved by the one or more engineering objects 108A-N, when the one or more engineering objects 108A-N executes the set of programming blocks. Examples of the set of key performance indicators includes a processing speed, a memory requirement, and a process efficiency of the one or more engineering programs, when the set of programming blocks are executed by a processor of the one or more engineering objects 108A-N. In one example, the ontology schema is a knowledge graph based representation comprising a plurality of layers. The plurality of layers comprises a first, a second, a third, and a fourth knowledge graph layers. The first knowledge graph layer comprises knowledge associated with the industrial domain of the technical installation 106. The second knowledge graph layer indicates a relationship between the industrial domain and the set of variables in each programming block of the set of programming blocks. The third knowledge graph layer indicates a relationship between a plurality of program Key Performance Indicators associated with the set of programming blocks, and the set of variables in each block of the set of programming blocks. The fourth knowledge graph layer indicates an object behavior model associated with the one or more engineering objects 108A-N in the technical installation 106. The object behavior model is a knowledge graph based representation of the one or more engineering objects 108A-N superimposed with one or more behavioral information associated with the one or more engineering objects 108A-N. The one or more behavioral information comprises information associated with relationship between the plurality of parameter values associated with the one or more engineering objects 108A-N, and one or more thresholds and conditions associated with the industrial domain of the technical installation 106. For example, a first parameter value, such as a rotation per minute (rpm) of a motor may be controlled by a first engineering object 108A-N, such as a motor controller. A first condition that the first parameter value must be lower than a specified threshold, may be applicable to the first parameter value. The object behavior model may store information associated with the first condition. The ontology schema stores a manner in which a programming block is written. The ontology schema stores the industrial domain associated with the technical installation 106. Further, a context associated with the one or more engineering objects 108A-N of the technical installation 106 is also stored in the ontology schema. The ontology schema enables the engineering system 102 to generate the engineering program while navigating through multiple contexts of the industrial domain of the technical installation 106.

The ontology schema is generated further based on learnings from previously generated engineering programs. The ontology schema creates an opportunity for poorly maintained program blocks with inconsistent quality and without any enhancement footprint to look back to and helps in further improvements of the engineering program. The learnings are obtained using any machine learning or artificial intelligence analysis method. For example, given a graphical program, the program logic, tokens, keywords, syntax, semantics, data structures associated with the graphical program are learnt and stored in the database 118 in the form of a trained program table.

In other words, the ontology schema further comprises one or more rules associated with one or more relationships the industrial domain of the technical installation 106, the set of variables corresponding to each programming block in the set of programming blocks and the set of Key performance indicators associated with the set of programming blocks. Further, the ontology schema comprises a representation of the one or more engineering objects 108A-N in the portion of the technical installation 106, the physical connections between the one or more engineering objects 108A-N, and the plurality of parameter values associated with the one or more engineering objects 108A-N. Each programming block of the set of programming block comprises a program logic associated with each of the one or more engineering objects 108A-N, the physical connections between the one or more engineering objects 108A-N and the plurality of parameter values. A user of the client device(s) 120A-N is enabled to modify each programming block in the set of programming blocks using the engineering tool 122A-N.

Further, the automation module 112 causes the processor(s) 202 to analyze the generated ontology schema. Further, the automation module 112 causes the processor 202 to modify one or more programming blocks in the set of programming blocks based on the outcome of analysis of the behavior. Furthermore, the automation module 112 causes the processor(s) 202 to generate the engineering program associated with the technical installation 106, based on modifications in the set of programming blocks. The generated engineering program represents an upgraded portion of the set of programming blocks. The upgraded portion of the set of programming blocks comprises a change in one or more key performance indicators associated with the set of programming blocks. The first set of key performance indicators associated with the set of programming blocks is different from a second set of key performance indicators associated with the generated engineering program.

In generating the object behavior model of the one or more engineering objects 108A-N based on the ontology schema, the automation module 112 causes the processor(s) 202 to identifying the one or more engineering objects 108A-N based on type of the one or more engineering objects 108A-N, one or more physical connections between the one or more engineering objects 108A-N, and a plurality of parameter values associated with the one or more engineering objects 108A-N and the physical connections. A functioning of the one or more engineering objects 108A-N may be defined based on the plurality of parameter values and the physical connections. The plurality of parameter values comprises motor configuration parameters, network and communication parameter, valve controls, temperature or pressure values of a sensor, speed, torque and the like. Specifically, property values embedded in all engineering objects 108A-N are read in order to analyze the set of programming blocks associated with the technical installation 106. Further, the automation module 112 causes the processor(s) 202 to classify the identified one or more engineering objects 108A-N into one or more engineering object blocks based on a unique identifier associated with each of the one or more identified engineering objects 108A-N. Also, the automation module 112 causes the processor(s) 202 to determine one or more engineering object 108A-N properties associated with each of the classified one or more engineering objects 108A-N. Also, the automation module 112 causes the processor(s) 202 to determine relationship between each of the one or more classified engineering objects 108A-N based on the ontology schema table. Further, the automation module 112 causes the processor(s) 202 to generate the object behavior model of the one or more engineering objects 108A-N based on the determined relationships between each of the one or more classified engineering objects 108A-N.

In analyzing the ontology schema associated with the set of programming blocks, the automation module 112 causes the processor(s) 202 to retrieve data and control parameters associated with the one or more engineering objects 108A-N. Further, the automation module 112 causes the processor(s) 202 to compare the retrieved data and control parameters associated with the one or more engineering objects 108A-N with data and control parameters stored in the object behavior model. Further, the automation module 112 causes the processor(s) 202 to identify deviation between the retrieved data and control parameters associated with the one or more engineering objects 108A-N and the data and control parameters stored in the object behavior model. Also, the automation module 112 causes the processor(s) 202 to determine type of behavior of the one or more engineering objects 108A-N corresponding to the identified deviation. The type of behavior comprises normal, abnormal, steady, and require maintenance and the like. Also, the automation module 112 causes the processor(s) 202 to analyze the behavior of the one or more engineering objects 108A-N based on the determined type of comparison.

The automation module 112 is further configured to generate the requested engineering program based on a modification of the set of programming blocks based on the analysis of the ontology schema and the behavior of the one or more engineering objects 108A-N. In modifying the set of programming blocks based on the outcome of analysis of the ontology schema, the automation module 112 causes the processor(s) 202 to determine the one or more engineering objects 108A-N, the physical connections between the one or more engineering objects 108A-N, and, the plurality of parameter values associated with the one or more engineering objects 108A-N and the physical connections. The outcome of analysis of the ontology schema for each of the programming blocks of the set of programming blocks indicate those programming blocks among the set of programming blocks, that require modification.

Also, the automation module 112 causes the processor(s) 202 to determine type of modification to be performed on the set of programming blocks. The modifications comprise any changes such as addition, deletion, update, replacement or revision of one or more variables, code lines, classes, functions, or comments in the set of programming blocks. In one example, an outcome of analysis of the ontology schema may be a behavior report indicating whether behavior or characteristic of each programming block of the set of programming blocks as defined in the ontology schema is acceptable, improvised, enhanced, optimized or the like. Thus, the set of programming blocks are modified based on the relationships between the set of variables corresponding to each programming block in the set of programming blocks, the set of Key performance indicators associated with the set of programming blocks, and the industrial domain of the technical installation 106. Thus, the engineering program is generated based on the relationships between the set of variables corresponding to each programming block in the set of programming blocks, the set of Key performance indicators associated with the set of programming blocks, and the industrial domain of the technical installation 106. In other words, the set of programming blocks are customized based on the ontology schema, to generate the engineering program which is suitable for the one or more engineering objects 108A-N in the technical installation 106.

Further, the automation module 112 causes the processor(s) 202 to generate a simulation instance for the engineering objects 108A-N. Further, the automation module 112 causes the processor(s) 202 to simulate behavior of the one or more engineering objects 108A-N of the technical installation 106 in a simulation environment by executing the engineering program on the generated simulation instance. Also, the automation module 112 causes the processor(s) 202 to validate the engineering program associated with the technical installation 106 based on results of simulation. Furthermore, the automation module 112 causes the processor(s) 202 to deploy the generated engineering program in real-time onto the one or more engineering objects 108A-N installed in the technical installation 106 based on the validation results.

The storage unit 206 may be a non-transitory storage medium configured for storing a database (such as database 118) which comprises server version of the plurality of programming blocks associated with the set of industrial domains.

The communication interface 208 is configured for establishing communication sessions between the one or more client devices 120A-N and the engineering system 102. The communication interface 208 allows the one or more engineering applications running on the client devices 120A-N to import/export engineering project files into the engineering system 102. In an embodiment, the communication interface 208 interacts with the interface at the one or more client devices 120A-N for allowing the engineers to access the engineering programs associated with an engineering project file and perform one or more actions on the engineering programs stored in the engineering system 102.

The input-output unit 210 may include input devices a keypad, touch-sensitive display, camera (such as a camera receiving gesture-based inputs), etc. capable of receiving one or more input signals, such as user commands to process engineering project file. Also, the input-output unit 210 may be a display unit for displaying a graphical user interface which visualizes the behavior model associated with the modified engineering programs and also displays the status information associated with each set of actions performed on the graphical user interface. The set of actions may include execution of predefined tests, download, compile and deploy of graphical programs. The bus 214 acts as interconnect between the processor 202, the memory 204, and the input-output unit 210.

The network interface 212 may be configured to handle network connectivity, bandwidth and network traffic between the engineering system 102, client devices 120A-N and the technical installation 106.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of an engineering system 102 as is unique to the present disclosure or necessary for an understanding of the present disclosure is depicted and described. The remainder of the construction and operation of the engineering system 102 may conform to any of the various current implementation and practices known in the art.

Figure 3:
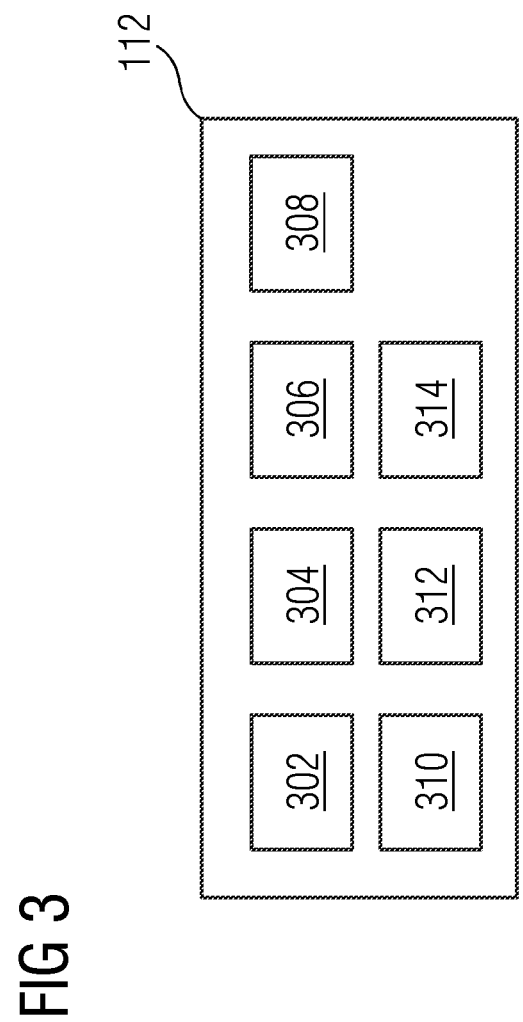
FIG. 3 is a block diagram of an automation module, such as those shown in FIG. 2, in which an embodiment of the present disclosure can be implemented.
Figure 4A:
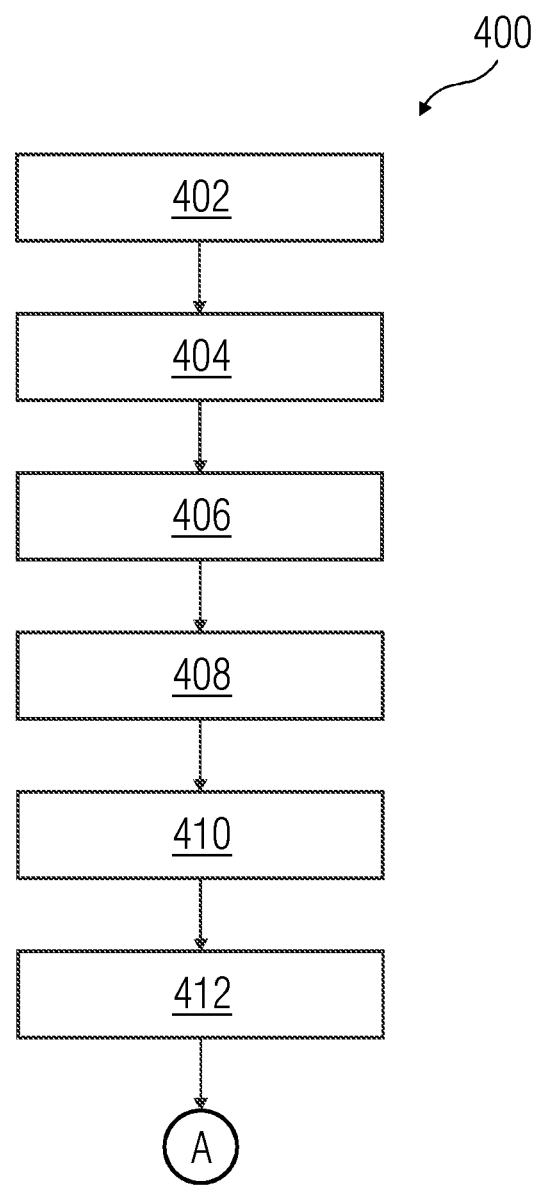
FIG. 4A is a process flowchart illustrating an exemplary method of generating engineering programs in an engineering system, according to an embodiment of the present disclosure.

FIG. 3 is a block diagram of an automation module 112, such as those shown in FIG. 2, in which an embodiment of the present disclosure can be implemented. In FIG. 3, the automation module 112 comprises a request handler module 302, an object behavior model generation module 304, an analysis module 306, a modifier module 308, an engineering object database 310, a validation module 312 and a deployment module 314. FIG. 3 is explained in conjunction with FIG. 1 and FIG. 2.

The request handler module 302 is configured for receiving the request to generate the engineering program associated with the industrial domain of the technical installation 106. For example, the request is received from one of the one or more users external to the industrial environment 100 via a network. In alternative embodiment, the request is received from the one or the one or more client devices 120A-N via the network. The request handler module 302 is further configured to determine the set of programming block associated with the industrial domain from the plurality of programming blocks associated with the set of industrial domains.

The object behavior model generation module 304 is configured for generating the ontology schema of the set of programming blocks. In a preferred embodiment, the generated ontology schema comprises information about relationships between the set of variables corresponding to each programming block in the set of programming blocks and the set of Key performance indicators associated with the set of programming blocks. The set of variables comprises a plurality of data and pointer variables defined and used in the set of programming blocks. The set of key performance indicators associated with the set of programming blocks are key performance indicators achieved by the one or more engineering objects 108A-N, when the one or more engineering objects 108A-N executes the set of programming blocks. In one example, the ontology schema is a knowledge graph based representation comprising a plurality of layers. The plurality of layers comprises a first, a second, a third, and a fourth knowledge graph layers. The first knowledge graph layer comprises knowledge associated with the industrial domain of the technical installation 106. The second knowledge graph layer indicates a relationship between the industrial domain and the set of variables in each programming block of the set of programming blocks. The third knowledge graph layer indicates a relationship between a plurality of program Key Performance Indicators associated with the set of programming blocks, and the set of variables in each block of the set of programming blocks. The fourth knowledge graph layer indicates an object behavior model associated with the one or more engineering objects 108A-N in the technical installation 106. The object behavior model comprises data and control parameters associated with the one or more engineering objects 108A-N. Further, the ontology schema comprises one or more rules associated with one or more relationships between the one or more engineering objects 108A-N. To generate the object behavior model, the object behavior model generation module 304 is configured to identify one or more engineering objects 108A-N based on type of the one or more engineering objects 108A-N, one or more physical connections between the one or more engineering objects 108A-N, and a plurality of parameter values associated with the one or more engineering objects 108A-N and the physical connections. Each of the one or more engineering objects 108A-N are associated with a unique identifier. The step of identification is achieved by analyzing a graphical program associated with an engineering object structurally in terms of, control flow, data flow, data usage. Specifically, property values embedded in all engineering objects are read in order to analyze the graphical program associated with the one or more engineering object 108-N. Then, the object behavior model generation module 304 is configured for classifying the identified one or more engineering objects 108A-N into one or more engineering object blocks 108A-N based on a unique identifier associated with each of the one or more identified engineering objects. Each of the one or more engineering object blocks comprises a set of defined actions to be performed. The one or more engineering object blocks comprises program variable block, domain block, component level block, configuration information block, subcomponent level block, program logic block, function block and the like. The set of actions to be performed is stored across respective one or more engineering object blocks as a hash table in the database 118. For example, if the type of the engineering object is a specific type of motor, then such specific type of a motor is classified under the engineering object block "motor". Similarly, if the type of the engineering object is a physical communication link cable between two engineering objects 108A-N, then the physical communication link cable is classified under "physical connections" and the like. The unique identifiers associated with such one or more engineering objects 108A-N help in classifying them into respective one or more engineering object block. Exemplary engineering object block category comprises basic block category, variable and statement category, statement category and the like.

Further, the object behavior model generation module 304 is configured for determining one or more engineering object properties associated with each of the classified one or more engineering objects 108A-N. The object properties are object's domain context, association and relationship with other engineering objects, object size, object identifier, type of engineering object, and the like. Such object properties are determined for each of the one or more engineering objects. Such determination using ontology enables engineering object elicitation & generalization, defines property & relationship between the engineering objects.

When once the object properties are determined, the object behavior model generation module 304 is configured for determining relationship between each of the one or more classified engineering objects 108A-N based on the determined relationships between each of the one or more classified engineering objects 108A-N. The object behavior model generation module 304 is further configured for generating the object behavior model of the one or more engineering objects.

In an embodiment, the object behavior model generation module 304 is also configured for managing the graphical programs corresponding to each of the one or more engineering objects 108A-N, physical connections between the one or more engineering objects 108A-N, and a plurality of parameter values associated with the one or more engineering objects 108A-N and the physical connections. A graphical program comprises a program logic. Each graphical program comprises a set of programmable instructions or statements corresponding to the program logic.

Each graphical program may correspond to a function block under an engineering design. The engineering design may comprise several such function blocks. The users at the client devices 120A-N uses the engineering tool 122A-N in order to design or develop engineering programs by coding each of these graphical programs.

The analysis module 306 is configured for analyzing the ontology schema associated with the set of programming blocks. Specifically, the analysis module 306 is configured for retrieving data and control parameters associated with each programming block of the set of programming blocks. The data and control parameters are key performance indicators comprising information relating to the set of programming blocks associated with the industrial domain of the technical installation 106, for example, sensor data, actuator data, environment data, network data, any automation data and the like. Further, the analysis module 306 is configured for comparing the retrieved data and control parameters associated with the set of programming blocks with data and control parameters stored in the object behavior model. Furthermore, the analysis module 306 is configured for identifying deviation between the retrieved data and control parameters associated with the set of programming blocks and the data and control parameters stored in the object behavior model. The deviation indicates a difference between the retrieved data and control parameters, and the data and control parameters stored in the object behavior model. Also, the analysis module 306 is configured for determining type of behavior of the one or more engineering objects 108A-N corresponding to the identified deviation. The type of behavior comprises normal, abnormal, steady, and require maintenance and the like. Furthermore, the analysis module 306 is configured for analyzing the behavior of the one or more engineering objects 108A-N based on the determined type of behavior. In one example, the analysis module 306 is configured to analyze the plurality of programming blocks by application of a natural language processing algorithm on a source code of the plurality of programming blocks.

The modifier module 308 is configured for modifying the set of programming blocks based on the outcome of analysis of the behavior and the ontology schema. The set of programming blocks is modified based on the analysis of the ontology schema. The modifications comprise any changes such as addition, deletion, update, replacement or revision of one or more variables, code lines, classes, functions, or comments in the set of programming blocks. In one example, an outcome of analysis of the ontology schema may be a behavior report indicating whether behavior or characteristic of each programming block of the set of programming blocks as defined in the ontology schema is acceptable, improvised, enhanced, optimized or the like. Thus, the set of programming blocks are modified based on the relationships between the set of variables corresponding to each programming block in the set of programming blocks, the set of Key performance indicators associated with the set of programming blocks, and the industrial domain of the technical installation 106. Thus, the engineering program is generated based on the relationships between the set of variables corresponding to each programming block in the set of programming blocks, the set of Key performance indicators associated with the set of programming blocks, and the industrial domain of the technical installation 106. In other words, the set of programming blocks are customized based on the ontology schema, to generate the engineering program which is suitable for the one or more engineering objects 108A-N in the technical installation.

The engineering object database 310 is configured for generating an engineering object library comprising the generated object behavior models, one or more engineering objects 108A-N, physical connections between the one or more engineering objects 108A-N, and a plurality of parameter values associated with the one or more engineering objects 108A-N and the physical connections. The engineering object database 310 is configured for continuously updating the engineering object library with updated versions of the engineering programs. Also, the engineering object database 310 is configured for maintaining the engineering object library in an ontology schema.

The validation module 312 is configured to generate a simulation instance for one or more engineering objects 108A-N of the technical installation. In one example, the simulation instance is a digital twin of the one or more engineering objects 108A-N. The validation module 312 is configured to simulate execution of the generated engineering program by the one or more engineering objects 108A-N of the technical installation 106 in a simulation environment by executing the set of programming blocks on the generated simulation instance. The validation module 312 is configured to determine that the generated engineering program is valid, based on a result of the simulated execution of the generated second set of programming blocks. Further, the validation module 312 is configured for simulating behavior of the set of programming blocks in the simulation environment by executing the set of programming blocks on the generated simulation instance. The simulation environment emulates an actual technical installation, such as technical installation 106. Further, the simulation environment may be a virtual setup of the actual technical installation 106. Also, the validation module 312 is configured for validating the behavior of the set of programming blocks based on results of simulation. The results of simulation may indicate success or failure of the engineering program or the set of programming block if deployed in the technical installation 106.

The deployment module 314 is configured for deploying the engineering program in real-time onto the one or more engineering objects 108A-N installed in the technical installation 106 based on the validation. The generated engineering program is only deployed onto the one or more engineering objects 108A-N after the determination that the generated engineering program is valid.

FIGS. 4A-D is a process flowchart illustrating an exemplary method 400 of generating engineering programs in an engineering system 102, according to an embodiment of the present disclosure.

At step 402, a request to generate an engineering program associated with the technical installation 106, is received by the processor 202. The request is received via the input-output unit 210. In request is received as at least one of a text command, a voice based command, a gesture based command, or as an input from a pointer device of the input-output unit 210. The request comprises an industrial domain associated with the technical installation 106. The technical installation 106 is at least one of an industrial manufacturing plant, an industrial processing plant, or an industrial power plant. The technical installation 106 comprises the one or more engineering objects 108A-N. The one or more engineering objects 108A-N are devices which function together in the technical installation 106 to achieve one or more objectives of the technical installation 106. Examples of the one or more engineering objects 108A-N comprises servers, robots, switches, automation devices, programmable logic controllers (PLC)s, human machine interfaces (HMIs), motors, valves, pumps, actuators, sensors and other industrial equipment(s).

At step 404 a set of programming blocks is determined by the processor 202, from the plurality of programming blocks corresponding to a set of industrial domains, based on the industrial domain associated with the technical installation 106. In one example, each programming block of the set of programming block may comprises a sequence of programming code which, when executed by the one or more engineering objects 108A-N, causes the one or more engineering objects 108A-N to perform one or more functions. The sequence of programming codes may be machine readable instructions written in a natural language, a high level programming language, an assembly language, or compiled code. The set of programming blocks that is specific to the industrial domain of the technical installation 106, is determined from the plurality of programming blocks associated with the set of the industrial domains. For example, the plurality of programming blocks comprises programming blocks associated with a first industrial domain like "bottle manufacturing industry", a second industrial domain like "power generation industry", a third industrial domain like "car manufacturing industry", and a fourth industrial domain like "machine manufacturing industry". The industrial domain of the technical installation 106 may be the first industrial domain. In such a case, the processor 202 determines the set of programming blocks which are associated with the first industrial domain. Thus, the determined set of programming blocks, when executed by the one or more engineering objects 108A-N, performs a plurality of functions which are specific to the first industrial domain of the technical installation 106. The set of programming blocks that is suited for the industrial domain of the technical installation 106, is automatically determined without manual intervention. Code development time and labour required to generate the engineering program which is specific to a particular industrial domain of the technical installation 106, is significantly reduced.

At step 406, an ontology schema for the set of programming blocks, is generated by the processor 202. The ontology schema comprises information about relationships between a set of variables corresponding to each programming block in the set of programming blocks and a set of Key performance indicators associated with the set of programming blocks. The set of variables comprises a plurality of data and pointer variables defined and used in the set of programming blocks. The set of key performance indicators associated with the set of programming blocks are key performance indicators achieved by the one or more engineering objects 108A-N, when the one or more engineering objects 108A-N executes the set of programming blocks. In one example, the ontology schema is a knowledge graph based representation comprising a plurality of layers. The plurality of layers comprises a first, a second, a third, and a fourth knowledge graph layers. The first knowledge graph layer comprises knowledge associated with the industrial domain of the technical installation 106. The second knowledge graph layer indicates a relationship between the industrial domain and the set of variables in each programming block of the set of programming blocks. The third knowledge graph layer indicates a relationship between a plurality of program Key Performance Indicators associated with the set of programming blocks, and the set of variables in each block of the set of programming blocks. The fourth knowledge graph layer indicates an object behavior model associated with the one or more engineering objects 108A-N in the technical installation 106. The object behavior model is a knowledge graph based representation of the one or more engineering objects 108A-N superimposed with one or more behavioral information associated with the one or more engineering objects 108A-N. The one or more behavioral information comprises information associated with relationship between the plurality of parameter values associated with the one or more engineering objects 108A-N, and one or more thresholds and conditions associated with the industrial domain of the technical installation 106. For example, a first parameter value, such as a rotation per minute (rpm) of a motor may be controlled by a first engineering object, such as a motor controller. A first condition that the first parameter value must be lower than a specified threshold, may be applicable to the first parameter value. The object behavior model may store information associated with the first condition.

In one example, to generate the ontology schema, the processor 202 is configured to analyze a source code of the set of programming blocks by use of a natural language processing algorithm. The source code of the set of programming blocks comprises comments, data variables, function, and classes. The processor 202 is configured to analyze the comments, data variables, function, and classes in the source code to a first knowledge graph comprising information about the industrial domain and a context associated with the set of programming blocks. Further, the first knowledge graph comprises annotations about a program logic of the set of programming blocks. The processor 202 is further configured to analyze the source code to generate a second knowledge graph comprising information about a program structure of the set of programming blocks. The processor 202 is further configured to determine one or more programming blocks in the set of programming blocks which has an identical business context, but has structural differences. The processor 202 is further configured to analyze the first knowledge graph and the second knowledge graph to determine a maximum and minimum value for each variable in the set of programming blocks. The processor 202 is further configured to update the generated ontology schema based on the determined maximum and minimum value for each variable in the set of programming blocks. The updated ontology schema comprises information on how to set up an industrial automation system in the technical installation 106.

At 408, the ontology schema associated with the set of programming blocks, is analyzed by the processor 202. At step 410, the engineering program associated with the technical installation 106 is generated by the processor 202, by modification of the set of programming blocks. The set of programming blocks is modified based on the analysis of the ontology schema. The modifications comprise any changes such as addition, deletion, update, replacement or revision of one or more variables, code lines, classes, functions, or comments in the set of programming blocks. In one example, an outcome of analysis of the ontology schema may be a behavior report indicating whether behavior or characteristic of each programming block of the set of programming blocks as defined in the ontology schema is acceptable, improvised, enhanced, optimized or the like. Thus, the set of programming blocks are modified based on the relationships between the set of variables corresponding to each programming block in the set of programming blocks, the set of Key performance indicators associated with the set of programming blocks, and the industrial domain of the technical installation 106. Thus, the engineering program is generated based on the relationships between the set of variables corresponding to each programming block in the set of programming blocks, the set of Key performance indicators associated with the set of programming blocks, and the industrial domain of the technical installation 106. In other words, the set of programming blocks are customized based on the ontology schema, to generate the engineering program which is suitable for the one or more engineering objects 108A-N in the technical installation 106.

At step 412, a first programming block of the set of programming blocks, is modified by the processor 202 based on a user instruction. The user instruction is at least one of a text based user instruction, a voice based user instruction, and a gesture based user instruction. In one example, a user, such as a code developer may modify the first programming block by entering one or more programming lines into the first programming block of the set of programming blocks.

At step 414, an occurrence of a variation in one or more key performance indicators associated with the set of programming blocks, is predicted by the processor 202 based on the analysis of the ontology schema. The variation is predicted to occur as a result of the modification of the first programming block. The variation may occur because of a plurality of control flow and data flow paths between each programming blocks of the set of programming blocks. The plurality of control flow and data flow paths are syntactic and semantic interconnections and relationships between each programming block of the set of programming blocks and one or more other programming blocks of the set of programming blocks. For example, a first programming block of the set of programming block may inherit one or more classes, functions, and/or variables from a second programming block of the set of programming block. Thus, isolated modification of any one programming block of the set of programming blocks may result in errors during compilation of other programming blocks of the set of programming blocks. Alternatively, any modification in the first programming block may modify one or more key performance indicators associated with the set of programming blocks. The code developer is enabled to modify the set of programming blocks without having to manually analyze the set of programming blocks to identify the plurality of control flow and data flow paths.

At step 416, one or more modifications for one or more programming blocks of the set of programming blocks, is determined by the processor 202, such that an implementation of the determined one or more modifications in the one or more programming blocks prevents the occurrence of the predicted variation in the one or more key performance indicators. In one example, a name of a variable, which is defined in the first programming block, is modified in the first programming block. In such a case, the method comprises determining a second programming block, in the set of programming blocks, in which the name of the variable is unchanged. Further, variation in a key performance indicator such as compilation time, as a result of the modification of the name of the variable is predicted by the processor 202. The variation in the compilation time may occur because of a lack of modification of the name of the variable in one or more references to the variable, in the second programming block. In such a case, it is determined by the processor 202 based on the analysis of the ontology schema, that the name of the variable in the one or more references to the modified variable, in the second programming block is to be modified so that any variation in the compilation time is prevented. In another example, a value of a variable, which is defined in the first programming block, is modified in the first programming block. In such a case, it is determined by the processor 202 a second programming block, in the set of programming blocks, which comprises one or more condition statements associated with the modified variable. Further, the processor 202 is configured to predict an occurrence of the variation in the key performance indicator such as compilation error, as a result of the modification of the value of the variable. In such a case, it is determined by the processor 202 that that the one or more condition statements in the second block are to be modified such that the occurrence of the variation in the compilation time of the set of programming blocks is prevented. The code developer is informed of variations in the one or more Key performance indicators before execution of the modified set of programming blocks.

At step 418, the one or more programming blocks of the set of programming blocks, are modified by the processor 202 based on the determined one or more modifications for the one or more programming blocks, to prevent the occurrence of the variation in the one or more key performance indicators associated with the set of programming blocks. Any variation in the one or more key performance indicators, which may occur due to modification of the first programming block, is prevented by automatic modification of other programming blocks of the set of programming blocks. Thus, if any one of the set of programming block is modified, the method enables automatic readjustment of other programming blocks of the set of programming blocks to optimize the one or more key performance indicators associated with the set of programming blocks.

At step 420, the set of programming blocks are analyzed by the processor 202 to determine one or more errors in a first programming block of the set of programming blocks. The method comprises modifying, by the processor 202, the first programming block of the set of programming blocks, to eradicate the determined one or more errors in the first programming block of the set of programming blocks. The one or more errors are automatically eradicated by the processor 202.

At step 422, an occurrence of a variation in one or more key performance indicators associated with the set of programming blocks is predicted by the processor 202 based on the analysis of the ontology schema. The variation is predicted to occur as a result of the modification of the first programming block.

At step 424, one or more modifications are determined by the processor 202 for one or more programming blocks of the set of programming blocks, such that an implementation of the determined one or more modifications in the one or more programming blocks prevents the occurrence of the predicted variation in the one or more key performance indicators.

At step 426, the one or more programming blocks of the set of programming blocks, are modified by the processor 202 based on the determined one or more modifications for the one or more programming blocks, to prevent the occurrence of the variation in the one or more key performance indicators associated with the set of programming blocks.

At step 428, a simulation instance is generated by the processor 202, for one or more engineering objects 108A-N of the technical installation 106. In one example, the simulation instance is a digital twin of the one or more engineering objects 108A-N.

At step 430, execution of the generated engineering program by the one or more engineering objects 108A-N of the technical installation 106 in a simulation environment by executing the set of programming blocks on the generated simulation instance.

At step 432, it is determined by the processor 202 that the generated engineering program is valid, based on a result of the simulated execution of the generated second set of programming blocks.

At step 434, the generated engineering program is deployed by the processor 202 in real-time onto the one or more engineering objects 108A-N, based on a determination that the generated engineering program is valid. The generated engineering program is only deployed onto the one or more engineering objects 108A-N after the determination that the generated engineering program is valid.

At step 436, the generated engineering program is displayed by the processor 202 on a display device such as the client devices 120A-N. The user is enabled to document the generated engineering program.

At step 438, an invalidity of the generated engineering program is notified by the processor 202 based on a determination that the generated engineering program is invalid. The user is informed that the generated engineering program is invalid. Thus, the user is enabled to correct and troubleshoot the engineering program.

At step 440, a plurality of error log files associated with the generated engineering program are generated by the processor 202 based on the determination that the generated engineering program is not valid. The plurality of error log files comprises a plurality of errors in the generated engineering programs. The plurality of errors are identified during the simulated execution of the generated engineering program.

At step 442, the generated plurality of error log files are displayed by the processor 202 on the display device.

Figure 5:
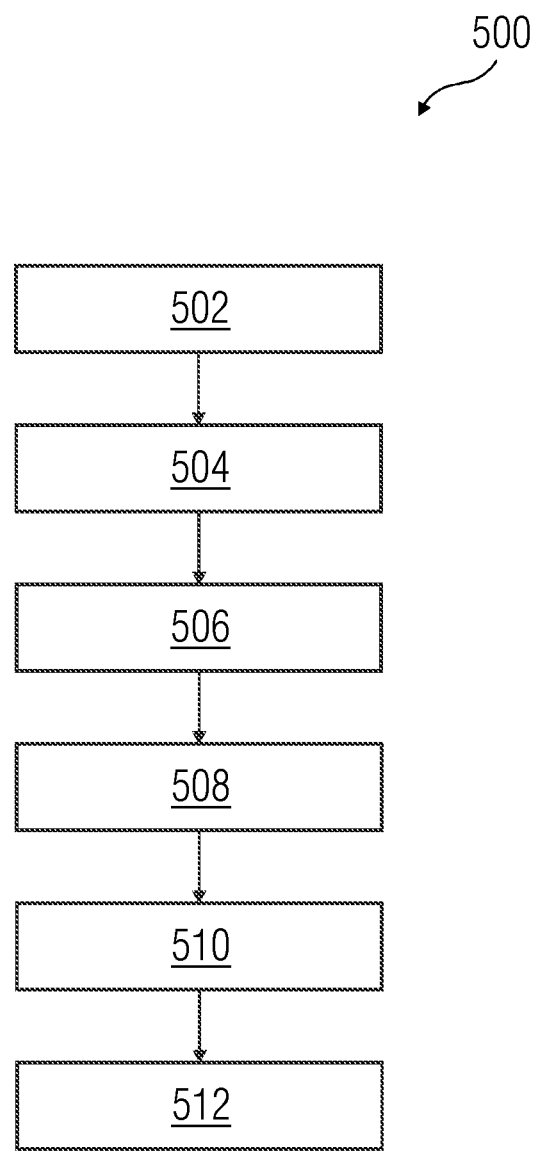
FIG. 5 is a process flowchart illustrating an exemplary method of generating object behavior model, according to an embodiment of the present disclosure.

FIG. 5 is a process flowchart illustrating an exemplary method 500 of generating engineering programs in an engineering system 102, according to an embodiment of the present disclosure.

At step 502, a set of programming blocks associated with one or more engineering objects 108A-N in a technical installation 106, are received by the processor 202.

At step 504, a set of desired key performance indicators associated with the set of programming blocks are received by the processor 202.

At step 506, an ontology schema for the set of programming blocks is generated by the processor 202. The ontology schema comprises information about relationships between a set of variables corresponding to each programming block in the set of programming blocks and a set of Key performance indicators associated with the set of programming blocks.

At step 508, the ontology schema associated with the set of programming blocks are analyzed by the processor 202. At step 510, a first engineering program associated with the technical installation 106 is generated by the processor 202 by modification of the set of programming blocks. The first engineering program is generated based on the analysis of the ontology schema. A plurality of key performance indicators of the first engineering program matches with the received set of desired key performance indicators.

At step 510, a user request to optimize the set of programming blocks is received by the processor 202. At step 510, an optimal set of key performance indicators for the one or more engineering objects 108A-N are determined by the processor 202 based on the analysis of the ontology schema. At step 512, a second engineering program associated with the technical installation 106 is generated by the processor 202 by modification of the set of programming blocks. The second engineering program is generated based on the analysis of the ontology schema. A plurality of key performance indicators of the second engineering program match with the determined optimal set of key performance indicators.

At step 512, a reduction in one or more key performance indicators associated with the set of programming blocks is detected by the processor 202. At step 516, a third engineering program associated with the technical installation 106 is generated by the processor 202 by modification of the set of programming blocks. The third engineering program is generated based on the analysis of the ontology schema. A plurality of key performance indicators of the third engineering program compensates the detected reduction in the one or more key performance indicators associated with the set of programming blocks.

FIGS. 6A-C is a schematic representation of an exemplary ontology schema, according to an embodiment of the present disclosure. The ontology schema comprises information about relationships between a set of variables corresponding to each programming block in the set of programming blocks and a set of Key performance indicators associated with the set of programming blocks. The set of variables comprises a plurality of data and pointer variables defined and used in the set of programming blocks. The set of key performance indicators associated with the set of programming blocks are key performance indicators achieved by the one or more engineering objects 108A-N, when the one or more engineering objects 108A-N executes the set of programming blocks. Examples of the set of key performance indicators includes a processing speed, a memory requirement, and a process efficiency of the one or more engineering programs, when the set of programming blocks are executed by a processor of the one or more engineering objects 108A-N. In one example, the ontology schema is a knowledge graph based representation comprising a plurality of layers. The plurality of layers comprises a first, a second, a third, and a fourth knowledge graph layers. In FIG. 6A, an exemplary first knowledge graph layer of the generated ontology schema is depicted. The first knowledge graph layer comprises knowledge associated with the industrial domain of the technical installation 106. In FIG. 6B, an exemplary second knowledge graph layer of the ontology schema is depicted. The second knowledge graph layer indicates a relationship between the industrial domain and the set of variables in each programming block of the set of programming blocks and a context of the set of variables in each programming block. In FIG. 6C, an exemplary combination of the first knowledge graph layer and the second knowledge graph layer is depicted. The third knowledge graph layer indicates a relationship between a plurality of program Key Performance Indicators associated with the set of programming blocks, and the set of variables in each block of the set of programming blocks. The fourth knowledge graph layer indicates an object behavior model associated with the one or more engineering objects 108A-N in the technical installation 106. The object behavior model is a knowledge graph based representation of the one or more engineering objects 108A-N superimposed with one or more behavioral information associated with the one or more engineering objects 108A-N. The one or more behavioral information comprises information associated with relationship between the plurality of parameter values associated with the one or more engineering objects 108A-N, and one or more thresholds and conditions associated with the industrial domain of the technical installation 106. For example, a first parameter value, such as a rotation per minute (rpm) of a motor may be controlled by a first engineering object, such as a motor controller. A first condition that the first parameter value must be lower than a specified threshold, may be applicable to the first parameter value. The object behavior model may store information associated with the first condition.

The present disclosure can take a form of a computer program product (non-transitory computer readable storage medium having instructions, which when executed by a processor, perform actions) comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the art.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of generating engineering programs for one or more engineering objects in a technical installation, the method comprising:
   receiving, by a processing unit, a request to generate an engineering program associated with the technical installation,
      wherein the request comprises an information on an industrial domain of operation associated with the technical installation and indicative of an objective of the technical installation, and
      wherein the request comprises an instruction to generate the engineering program which, when executed by the one or more engineering objects, causes the one or more engineering objects to perform a set of functions which are specific to the industrial domain of the technical installation;
   determining, by the processing unit, a set of programming blocks from a plurality of programming blocks corresponding to a set of industrial domains, based on the information on the industrial domain associated with the technical installation;
   generating, by the processing unit, an ontology schema for the set of programming blocks, wherein the ontology schema comprises information about relationships between a set of variables and a set of key performance indicators,
      wherein the set of variables corresponds to each programming block in the set of programming blocks, and
      wherein the set of key performance indicators is associated with the set of programming blocks and the key performance indicators are key performance indicators achieved by the one or more engineering objects;
   analyzing, by the processing unit, the ontology schema associated with the set of programming blocks;
   generating, by the processing unit, the engineering program associated with the technical installation by modification of the set of programming blocks, wherein the set of programming blocks is modified based on the analysis of the ontology schema;
   generating, by the processing unit, a simulation instance for the one or more engineering objects of the technical installation; and
   simulating, by the processing unit, execution of the generated engineering program by the one or more engineering objects of the technical installation in a simulation environment by executing the set of programming blocks on the generated simulation instance,
   wherein the technical installation comprises one or more devices which are controlled by the one or more engineering objects,
   wherein the one or more engineering objects comprise at least one of a programmable logic controller, a field device, and an automation device, and
   wherein the one or more devices comprise at least one of a control valve, a motor, a pump, and an actuator.

2. The method according to claim 1, further comprising:
   modifying, by the processing unit, a first programming block of the set of programming blocks, based on a user instruction;
   predicting, by the processing unit, an occurrence of a variation in one or more key performance indicators associated with the set of programming blocks, based on the analysis of the ontology schema, wherein the variation is predicted to occur as a result of the modification of the first programming block;
   determining, by the processing unit, one or more modifications for one or more programming blocks of the set of programming blocks based on the predicted occurrence of the predicted variation in the one or more key performance indicators; and
   modifying, by the processing unit, the one or more programming blocks of the set of programming blocks, based on the determined one or more modifications for the one or more programming blocks, to prevent the occurrence of the variation in the one or more key performance indicators associated with the set of programming blocks.

3. The method according to claim 1, further comprising:
   analyzing, by the processing unit, the set of programming blocks to determine one or more errors in a first programming block of the set of programming blocks;
   modifying, by the processing unit, the first programming block of the set of programming blocks, to eradicate the determined one or more errors in the first programming block of the set of programming blocks;
   predicting, by the processing unit, an occurrence of a variation in one or more key performance indicators associated with the set of programming blocks based on the analysis of the ontology schema, wherein the variation is predicted to occur as a result of the modification of the first programming block;
   determining, by the processing unit, one or more modifications for one or more programming blocks of the set of programming blocks based on the predicted occurrence of the predicted variation in the one or more key performance indicators; and
   modifying, by the processing unit, the one or more programming blocks of the set of programming blocks, based on the determined one or more modifications for the one or more programming blocks, to prevent the occurrence of the variation in the one or more key performance indicators associated with the set of programming blocks.

4. The method according to claim 1, further comprising:
   determining, by the processing unit, whether the generated engineering program is valid, based on a result of the simulated execution of the set of programming blocks on the generated simulation instance;
   deploying, by the processing unit, the generated engineering program in real-time onto the one or more engineering objects, based on a determination that the generated engineering program is valid; and displaying, by the processing unit, the generated engineering program on a display device.

5. The method according to claim 1, further comprising:

notifying, by the processing unit, about an invalidity of the generated engineering program, based on a determination that the generated engineering program is invalid;

generating, by the processing unit, a plurality of error log files associated with the generated engineering program, based on the determination that the generated engineering program is invalid; and displaying, by the processing unit, the generated plurality of error log files on a display device.

6. The method according to claim 1, wherein the ontology schema is a knowledge graph based representation comprising a plurality of layers, and the plurality of layers comprises:
a first knowledge graph layer comprising knowledge associated with the industrial domain of the technical installation,
a second knowledge graph layer which indicates a relationship between the industrial domain and the set of variables in each programming block of the set of programming blocks,
a third knowledge graph layer which indicates a relationship between a plurality of program key Performance Indicators associated with the set of programming blocks, and the set of variables in each block of the set of programming blocks, and
a fourth knowledge graph layer which indicates an object behavior model associated with a plurality of engineering objects in the technical installation.

7. An engineering system for generation of the engineering programs for the one or more engineering objects in the technical installation, wherein the engineering system comprises:

one or more processor(s); and
a memory coupled to the one or more processor(s), wherein the memory comprises an automation module stored in the form of machine-readable instructions executable by the one or more processor(s), wherein the automation module is capable of performing the method according to claim 1.

8. An industrial environment comprising:
the engineering system as claimed in claim 7;
the technical installation comprising one or more physical components; and
one or more client devices communicatively coupled to the engineering system via a network, wherein the engineering system is configured to perform the method.

9. A computer program product, comprising a computer readable hardware storage device having computer readable program code stored therein, said program code executable by a processor of a computer system to implement the method according to claim 1.

10. A method of generating engineering programs for one or more engineering objects in a technical installation, comprising:

receiving, by a processing unit, a set of programming blocks associated with one or more engineering objects in a technical installation;

receiving, by the processing unit, a set of desired key performance indicators associated with the set of programming blocks; and generating, by the processing unit, an ontology schema for the set of programming blocks, wherein the ontology schema comprises information about relationships between a set of variables and a set of key performance indicators,
wherein the set of variables corresponds to each programming block in the set of programming blocks, and
wherein the set of Key performance indicators is associated with the set of programming blocks and the set of key performance indicators are key performance indicators achieved by the one or more engineering objects;

analyzing, by the processing unit, the ontology schema associated with the set of programming blocks;

generating, by the processing unit, a first engineering program associated with the technical installation by modification of the set of programming blocks, wherein the first engineering program is generated based on the analysis of the ontology schema, and
a plurality of key performance indicators of the first engineering program matches with the received set of desired key performance indicators;

generating, by the processing unit, a simulation instance for the one or more engineering objects of the technical installation; and simulating, by the processing unit, execution of the generated engineering program by the one or more engineering objects of the technical installation in a simulation environment by executing the set of programming blocks on the generated simulation instance, wherein the technical installation comprises one or more devices which are controlled by the one or more engineering objects, wherein the one or more engineering objects comprise at least one of a programmable logic controller, a field device, and an automation device, and wherein the one or more devices comprise at least one of a control valve, a motor, a pump, and an actuator.

11. The method according to claim 10, further comprising:

receiving, by the processing unit, a user request to optimize the set of programming blocks;

determining, by the processing unit, an optimal set of key performance indicators for the one or more engineering objects; and generating, by the processing unit, a second engineering program associated with the technical installation by modification of the set of programming blocks, wherein the second engineering program is generated based on the analysis of the ontology schema, and
a plurality of key performance indicators of the second engineering program match with the determined optimal set of key performance indicators.

12. The method according to claim 10, further comprising:

detecting, by the processing unit, a reduction in one or more key performance indicators associated with the set of programming blocks; and generating, by the processing unit, a third engineering program associated with the technical installation by modification of the set of programming blocks, wherein the third engineering program is generated based on the analysis of the ontology schema, and
a plurality of key performance indicators of the third engineering program compensates the detected reduction in the one or more key performance indicators associated with the set of programming blocks.

\* \* \* \* \*